United States Patent
Volk (10) Patent No.: US 11,932,499 B2
(45) Date of Patent: Mar. 19, 2024

(54) MECHANICAL CARRIER SAVING IN A MULTICARRIER SYSTEM

(71) Applicant: Schneider Electric Industries SAS, Rueil-Malmaison (FR)

(72) Inventor: Reiner Volk, Helmstadt (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 17/847,642

(22) Filed: Jun. 23, 2022

(65) Prior Publication Data

US 2022/0411207 A1  Dec. 29, 2022

(30) Foreign Application Priority Data

Jun. 24, 2021 (EP) .................................. 21305874.

(51) Int. Cl.
*B65G 54/02* (2006.01)
*B60L 13/03* (2006.01)
*H02K 41/02* (2006.01)

(52) U.S. Cl.
CPC .............. *B65G 54/02* (2013.01); *B60L 13/03* (2013.01); *H02K 41/02* (2013.01); *B60L 2200/26* (2013.01)

(58) Field of Classification Search
CPC ......... B65G 54/02; H02K 41/02; B60L 13/03; B60L 2200/26
USPC ....................................................... 198/805
See application file for complete search history.

(56) References Cited

U.S. PATENT DOCUMENTS

| | | | | |
|---|---|---|---|---|
| 6,208,497 B1 * | 3/2001 | Seale | ..................... | H02K 41/03 361/160 |
| 6,398,016 B1 * | 6/2002 | Maeder | .................. | B65H 29/02 198/867.13 |
| 11,634,287 B2 * | 4/2023 | Yamasaki | .............. | C12M 33/04 198/805 |
| 2013/0280996 A1 | 10/2013 | Bachtle | | |
| 2021/0253373 A1 | 8/2021 | Elsperger et al. | | |

FOREIGN PATENT DOCUMENTS

| | | |
|---|---|---|
| CN | 105782239 A | 7/2016 |
| DE | 209105 C | 4/1909 |
| DE | 196 29 716 A1 | 1/1998 |
| DE | 10 2018 209 724 A1 | 12/2019 |
| EP | 0 105 769 A2 | 4/1984 |

(Continued)

OTHER PUBLICATIONS

Extended European Search Report dated Dec. 17, 2021 in European Patent Application No. 21305874.6, 8 pages.

*Primary Examiner* — James R Bidwell
(74) *Attorney, Agent, or Firm* — Oblon, McClelland, Maier & Neustadt, L.L.P.

(57) ABSTRACT

A linear motor system, which is in particular a transport system and, for example, a multi-carrier system, includes a guide track having a plurality of electromagnets arranged distributed along the guide track; and at least one carrier that is guided by and movable along the guide track and that has a drive magnet for cooperating with the electromagnets to move the carrier. The linear motor system furthermore has at least one coupling element and at least one securing structure that extends along the guide track and that is held by the coupling element. The coupling element couples the securing structure to the carrier.

13 Claims, 5 Drawing Sheets

(56) References Cited

FOREIGN PATENT DOCUMENTS

| | | | |
|---|---|---|---|
| EP | 0 820 862 A2 | 1/1998 | |
| EP | 2 653 036 A1 | 10/2013 | |
| JP | 3-31197 A | 2/1991 | |
| JP | 2002-58233 A | 2/2002 | |
| JP | 2010057280 A * | 3/2010 | ............ H02K 41/03 |
| KR | 10-1730974 B1 | 4/2017 | |

* cited by examiner

MECHANICAL CARRIER SAVING IN A MULTICARRIER SYSTEM

BACKGROUND

The invention relates to a linear motor system and to a method of operating the same. The linear motor system has at least one carrier and a guide track having a plurality of electromagnets that are arranged distributed along the guide track and that cooperate with a drive magnet of the carrier to move the carrier along the guide track.

Linear motor systems are widely used today. They can, for example, be used to move, in particular to transport, products in industrial plants. Multi-carrier systems are particularly advantageous for the flexible transport of the most varied products. They comprise a plurality of carriers, i.e. transport units, that can be moved individually and independently of one another. In a typical multi-carrier system, a guide track for the carriers is closed in itself, which enables a revolving operation.

Different forces and torques act on a carrier during the movement along the guide track, for example forces due to an acceleration or a deceleration of the carrier and centrifugal forces during a cornering. In particular the position of the center of gravity of the carriers is responsible for the magnitude of the torques. There is a risk that these forces, which occur due to the movement of the carrier, exceed those forces that hold the carrier at the guide track and, as a result thereof, the carrier detaches itself from the guide track, possibly at a high speed, and leaves the movement path described by the guide track. Due to this flying off of a carrier from the guide track, both damage to property can occur and bystanders can be injured. The carrier is typically held at the guide track by magnetic forces. During the normal operation, the magnetic forces should always keep the carrier at the guide track and prevent a departure of the carrier from the movement path described by the guide track. As a result of incorrect settings, which can in particular occur during the putting into operation of a linear motor system, it can occur that the magnetic forces that hold the carriers at the guide track are too small at times so that one or even a plurality of carriers can no longer be held at the guide track during their movement. Carriers being released can then pose a serious danger to bystanders or adjacent machines.

BRIEF SUMMARY

It is an object of the invention to provide a linear motor system and a method of operating the same that increase the safety during the operation of the linear motor system.

This object is satisfied by the subjects of the independent claims.

A linear motor system, which is in particular configured as a transport system and, for example, as a multi-carrier system, comprises a guide track that has a plurality of electromagnets arranged distributed along the guide track; and at least one carrier that is guided by and movable along the guide track and that has a drive magnet for cooperating with the electromagnets to move the carrier. The linear motor system further comprises at least one coupling element and at least one securing means that extends along the guide track and that is held by the coupling element, wherein the coupling element couples the securing means to the carrier.

A plurality of carriers are preferably provided that are each connected to the securing means via coupling elements. The carriers can thus be connected to one another via the securing means.

In accordance with the invention, the safety of the linear motor system can be increased in a simple manner, in particular during its putting into operation, since carriers that leave the guide track can be braked or stopped by the securing means. Injuries to persons or damage to adjacent objects can thus be effectively prevented.

Due to the fact that the securing means (via the coupling elements) is held by the carriers, the electromagnets or the linear motors and/or the guide track do not have to be changed mechanically. A retrofitting of the securing means is thus possible at any time.

The securing means can preferably be held solely by the carriers. A dedicated fastening of the securing means to the linear motors and/or to the guide track is preferably not provided.

The invention is based on the recognition that a securing means, which is coupled, in particular exclusively coupled, to the carriers of a linear motor system, secures the carriers in that a movement of the carriers that removes the carriers from the movement path predefined by the guide track brakes and/or stops the carriers. An additional coupling of the securing means to the guide track is preferably not required.

The function of the coupling element is to hold the securing means and to couple it to the carriers. The coupling between the carriers and the securing means is to be understood such that the coupling element effects a force transmission between the carriers and the securing means, in particular in the case of forces that act transversely to the guide track. In the event that the linear motor system comprises a plurality of carriers that are coupled to the securing means, the forces that act on a carrier on the flying off from the guide track are partly transmitted to the remaining carriers and/or the guide track via the coupling elements and the securing means, whereby the movement of the carrier is braked and/or stopped transversely to the guide track. The force on the flying off is thus distributed over a plurality of carriers. Spot loads on the guide track can be avoided in this manner.

The securing means is preferably coupled to all the carriers of the linear motor system via the coupling elements. So that an individual movement and likewise a securing of each carrier along the total guide track are possible, the securing means extends along the total guide track. The carriers can be coupled to a plurality of securing means to increase the force transmission between the carriers on the flying off of a carrier. Due to the use of a plurality of securing means, higher forces can be transmitted to the securing means on the flying off of a carrier without the securing means tearing or being damaged. Furthermore, the use of a plurality of securing means allows individual securing means to be coupled to the carrier at different positions of the carrier via the coupling elements. The force that is transmitted to the remaining carriers on the flying off of a carrier can hereby be distributed such that the movement of the carrier transverse to the guide track is braked and/or stopped more effectively and the remaining carriers and the guide track are subjected to less stress. The securing means are preferably held solely by the coupling element.

The drive magnet can also comprise a plurality of individual magnets, in particular permanent magnets.

The guide track can be formed by a plurality of linear motors (i.e. segments). Each linear motor preferably comprises a plurality of the electromagnets by means of which the carriers are moved.

The carriers can preferably be guided by rollers at a peripheral outer wall of the linear motors and can move along the outer wall during operation. The securing means is preferably formed adjacent to and/or regionally and/or temporarily contacting the peripheral outer wall. The securing means can accordingly have a length that is greater than the length of the guide track and/or the length of the peripheral outer wall. The peripheral outer wall can be part of the guide track.

Advantageous further developments of the invention are set forth in the dependent claims, in the description, and in the drawings.

In accordance with an embodiment, the securing means is configured to brake and/or to stop the movement of the carrier in a direction away from the guide track and/or transverse to the guide track on a release of the carrier from the guide track. On the flying off of a carrier from the guide track, i.e., for example, on a movement of a carrier transverse to the guide track that has the result that the carrier detaches itself from the guide track and leaves the movement path described by the guide track so that a further movement of the carrier from the cooperation between the electromagnets and the drive magnets is no longer given, forces occur in dependence on the speed of the carrier, the mass of the carrier together with the transport load, and the completed movement path, which forces are withstood and counteracted by the securing means. The movement of the carrier in a direction transverse to the guide track and/or away from the guide track (e.g. a falling down of the carrier) is thus effectively braked and/or stopped.

The securing means can further be an annular band closed in itself or an annular wire closed in itself. The securing means preferably comprises metal and/or a synthetic material. The material and material thickness are selected so that the securing means withstands the forces that occur on the flying off of a carrier from the guide track and that act on the securing means. The securing means can furthermore comprise a closure for opening the annular band or wire. In general, the securing means can be releasable without tools in that e.g. the closure is to be opened without tools. In an advantageous embodiment, the securing means is untensioned during the normal operation of the linear motor system, in particular no or only small forces act on the securing means transversely to the guide track. The securing means is tensioned by the forces acting transversely to the guide track on the securing means only on a flying off of a carrier from the guide track, whereby the movement of the carrier is braked and/or stopped.

In accordance with an embodiment, the linear motor system comprises a plurality of carriers and a plurality of coupling elements and the securing means is held solely by the coupling elements. Each carrier is coupled to the at least one securing means by at least one coupling element. The securing means is preferably held solely by the coupling elements that are connected to the carriers and does not have a further coupling to the guide track or other components of the linear motor system. Nevertheless, it is naturally possible that the securing means contacts the guide track or exerts a force onto the guide track on the flying off of a carrier. The design without a fixedly provided coupling to the guide track enables a particularly simple and inexpensive securing of the carriers and moreover reduces the wear of the securing means that would arise due to an additional friction between the securing means and further coupling elements.

In accordance with a further embodiment, the coupling element is releasably connected to the carrier. The securing in accordance with the invention of the carriers can hereby also be retrofitted with little effort to already existing linear motor systems. The coupling element is, for example, hooks or ring hooks which have a thread for the connection to the carrier and into which the securing means can be hung.

The coupling element is furthermore arranged between the guide track and the carrier. Forces occurring transversely to the guide track can hereby be effectively counteracted, in particular on a flying off of a laterally guided carrier in the horizontal movement. Furthermore, due to this arrangement of the coupling element, surfaces of the carrier facing away from the guide track are kept free for other functionalities such as the transport of objects.

Alternatively or additionally, the coupling element comprises at least one leadthrough through the carrier. The leadthrough through the carrier preferably extends along the direction in which the guide track extends so that the carriers coupled to the securing means can move along the guide track and the securing means is subjected to as little stress as possible by the movement of the carriers. The leadthrough can be configured as a closed leadthrough within the carrier or as a leadthrough through the carrier that is open at one side, whereby a simple insertion of the securing means into the leadthrough is possible. In the case of the closed leadthrough, it can be formed such that the securing means can be guided through the leadthrough or such that the leadthrough can be opened so that the securing means can be inserted to achieve a simple coupling and decoupling of the carrier and the securing means.

In accordance with an embodiment, the securing means is releasably guided through the coupling element. The simple coupling and decoupling of the carrier and the securing means that is hereby achieved enables a fast removal and addition of carriers from or into a linear motor system in accordance with the invention. Furthermore, an unproblematic exchange of securing means is thereby made possible.

In accordance with a further embodiment, the carrier moves along the securing means. Furthermore, the securing means is held by the coupling element such that the securing means moves along the guide track. The extent to which the securing means, due to the movement of a carrier, moves along the guide track is in particular determined by the manner in which the securing means is held by the coupling element. To enable an independent and individual movement of a plurality of carriers coupled to the securing means along the guide track, the securing means is held by the coupling means such that the carrier can move along the securing means. Due to friction between the securing means and the coupling element, a movement of the securing means along the guide track, in particular a slight movement, i.e. a movement that is slower on average than the average speed of the carriers, can occur. The movement of the securing means can result in uniform wear of the securing means as a positive effect.

In accordance with an embodiment, the linear motor system comprises a detection means for detecting the spacing of the carrier from the guide track. The detection means can, for example, comprise a position detection system of the linear motor system. The position detection system can in particular have magnetic sensors or Hall sensors that are arranged along the guide track and that detect, in particular multidimensionally detect, encoder magnets of the carriers. In particular after the putting into operation of a linear motor system or after modifications to the linear motor system, the measurements of the spacing between the carrier and the guide track that took place by the detection means can be suitable to determine whether the error-free regular operation of the linear motor system is achieved.

It is a further subject of the invention to provide a method of operating a linear motor system as is described above, for example. The linear motor system comprises a guide track that has a plurality of electromagnets arranged distributed along the guide track; at least one carrier that is guided by and movable along the guide track and that has a drive magnet for cooperating with the electromagnets to move the carrier; at least one coupling element; and at least one securing means, wherein the coupling element couples the securing means to the carrier. The method further comprises guiding the securing means through the coupling element and moving the carrier along the guide track.

Since a securing means is coupled to the carriers of the linear motor system via coupling elements, the method in accordance with the invention enables the operation of a linear motor system in which a movement of a carrier transverse to the guide track or generally away from the guide track is braked and/or stopped. Furthermore, the method makes it possible to supplement existing linear motor systems, which already have a coupling element, by a securing means to be able to perform the method in accordance with the invention in this manner.

In accordance with an embodiment of the method, the coupling element is releasably connectable to the at least one carrier and the method further comprises connecting the coupling element to the carrier. Thus, already existing linear motor systems that do not have a coupling element can be supplemented by a coupling element to be able to perform the method in accordance with the invention.

In accordance with a further embodiment of the method, the linear motor system comprises a detection means for detecting the spacing of the carrier from the guide track. The method further comprises releasing the securing means from the carriers and/or releasing the guiding of the securing means through the coupling element when the detection means detects a spacing between the carrier and the guide track, said spacing being smaller, preferably permanently smaller, than a threshold value. A spacing below the threshold value indicates that the carrier is always sufficiently attracted to the guide track and/or the electromagnet and, accordingly, there is no risk of a flying off. The securing means is preferably released when the carrier temporarily or permanently has a spacing that is smaller than the threshold value during a typical movement along the guide track. This can in particular take place after a putting into operation phase of the linear motor system when it is recognized that the linear motor system works correctly and reliably. It is hereby ensured that the securing means is only removed from the coupling to the carriers when an error-free and correct operation of the linear motor system can be assumed.

Alternatively or additionally, the securing means can be released when the carriers are moved with a reduced mass, i.e. with a reduced transport load, for test purposes. Due to the reduced mass, the occurring forces and/or torques can be reduced. The movement with a reduced mass can in particular take place in a putting into operation phase.

If it is recognized, for example by means of the detection means, that a carrier has detached itself from the track, the linear motor system can output a warning signal and/or can directly stop the movements of all the carriers.

BRIEF DESCRIPTION OF THE DRAWINGS

The invention will be described in the following purely by way of example with reference to the Figures. There are shown.

DETAILED DESCRIPTION

Figure 1:
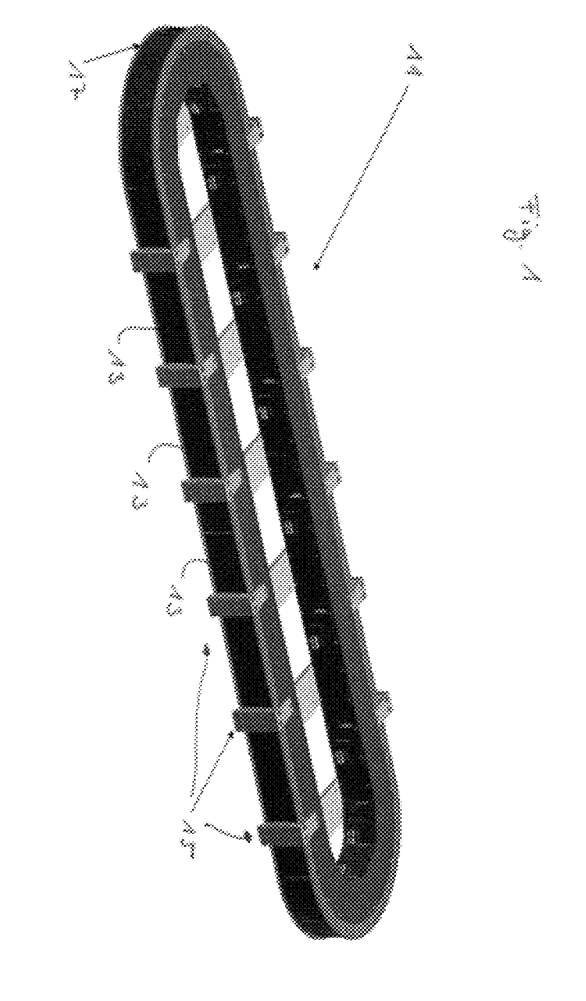
FIG. 1 a linear motor system configured as a transport system.

FIG. 1 represents a linear motor system 11 that is configured as a multi-carrier system. The linear motor system 11 comprises a plurality of linear motors 13 that are associated with segments and that are arranged in a row so that a continuous and in this case a revolving movement of the carriers 15 along a guide track 17 is made possible. The guide track 17 extends peripherally around the linear motor system 11. The transport system 11 further comprises a plurality of carriers 15 that form individual transport elements of the transport system 11 and that can be moved independently of one another along the guide track 17 by means of the linear motors 13. The carriers 15 are guided by means of rollers (not shown) at a peripheral outer wall of the linear motor system.

Figure 2:
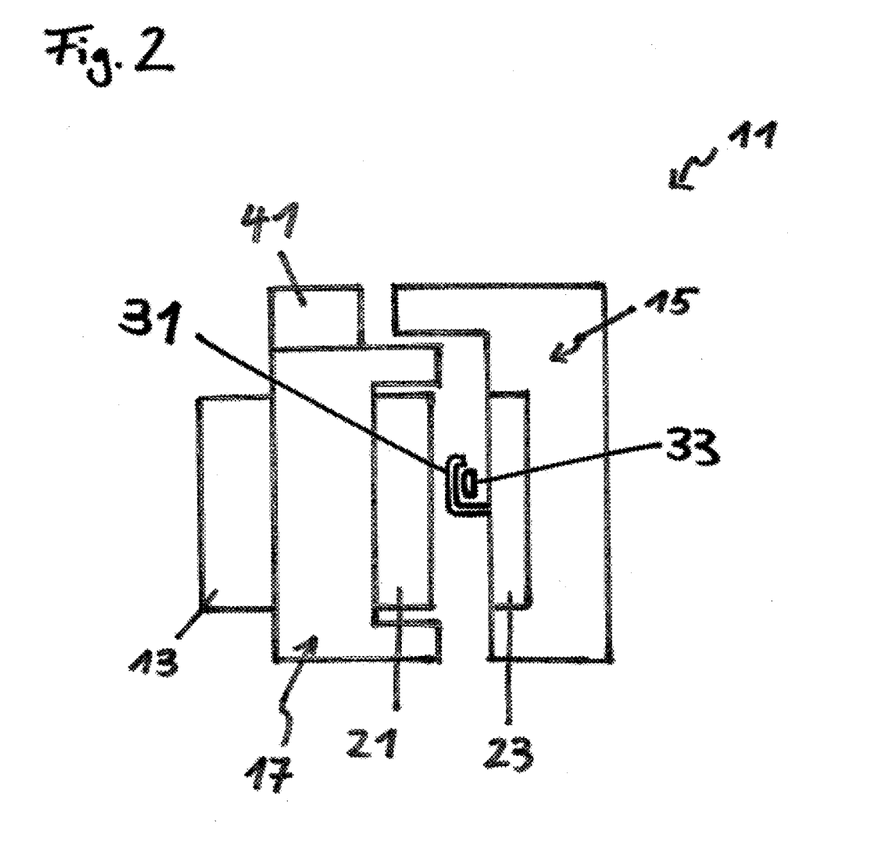
FIG. 2 a sectional view of a section of a linear motor system in accordance with a first embodiment with a sectional plane perpendicular to the guide track.

In FIG. 2, a segment of the linear motor system 11 with a carrier 15 in a first embodiment is shown in a sectional view. The carrier 15 can be moved along the guide track 17 by the cooperation of electromagnets 21, which are arranged at and along the guide track 17, and a drive magnet 23. The direction of movement of the carrier 15 extends perpendicular to the sectional plane of the representation in FIG. 2, i.e. along a normal to the sectional plane.

A securing means 33, which is a band composed of a synthetic material, extends along the total guide track 17 and is formed as closed. The securing means 33 can solely consist of a synthetic material or metal or comprise a synthetic material and/or metal. The securing means 33 can be configured as a band or as a wire.

The cross-sectional shape of the securing means 33 can be circular or square or can have any desired other shape. Furthermore, the securing means 33 can both have a pronounced elasticity and be substantially rigid. The securing means 33 is in any case adapted to the effect that it withstands the forces that can occur and act on the securing means 33 on a flying off of a carrier 15 from the guide track 17 during the operation of the linear motor system 11, and to the effect that it brakes and/or stops a further movement of the carrier 15 transverse to the guide track 17 and/or away from the guide track 17.

So that the securing means 33 can brake or stop a movement of the carrier 15 transverse to the guide track 17 that occurs due to the flying off of a carrier 15 from the guide track 17, the securing means 33 is coupled to the carrier 15 by means of a coupling element 31. In the first embodiment of the linear motor system 11 shown in FIG. 2, the coupling element 31 is a hook which is connected to the carrier 15 and into which the securing means 33 is releasably hooked. The shape of the hook can be formed in a variety of ways, for example, the coupling element 31 can also be configured as a closed ring hook through which the securing means 33 is guided. The coupling element 31 is releasably connected to the carrier 15 by means of a thread. The coupling element 31 can also be connected to the carrier 15 in a different manner as long as the connection between the coupling element 31 and the carrier 15 withstands the occurring forces that can occur on the flying off of the carrier 15 from the guide track 17 and on the subsequent movement of the carrier 15 transverse to the guide track 17 and/or away from the guide track 17.

Each carrier 15 of the linear motor system 11 has a coupling element 31 that couples the securing means 33 to the respective carrier 15. The carriers 15 can also each have more than one coupling element 31. The coupling elements 31 furthermore hold the securing means 33 and thus prevent a falling down of the securing means 33. The securing means 33 is held solely by the coupling elements 31 that couple the securing means 33 to the carriers 15. The securing means 33 is not coupled to the guide track 17 or other elements of the linear motor system 11.

On the movement of a single carrier 15 along the guide track 17 or in the case of a plurality of carriers 15 that move along the guide track 17 in the same direction, the securing means 33 typically moves at a slower speed than the carrier 15 or the plurality of carriers 15 due to the friction between the securing means 33 and the coupling elements 31. In this respect, the securing means 33 moves along the guide track 17 in the same direction as the carrier 15 or the plurality of carriers 15. If carriers 15 of the linear motor system 11, in contrast, briefly move in different directions along the guide track 17, the securing means 33 either moves in the one or the other direction along the guide track 17 or stands still.

The detection means 41 measures the spacing between the guide track 17 and the carrier 15. If the detection means 41 measures a spacing between the guide track 17 and the carrier 15 over a longer period of time that is below a certain threshold value and that can be understood as a tolerance for an error-free and correct operation of the linear motor system 11 with respect to the spacing between the guide track 17 and the carrier 15, it can be assumed that a flying off of a carrier 15 from the guide track 17 is unlikely and the securing means 33 can be released from the coupling to the carriers 15. The detection means 41 can be arranged at the guide track 17 or at the carrier 15. The detection means 41 can further comprise a detection element (e.g. a Hall sensor) that is arranged at the guide track 17 and a further detection element (e.g. an encoder magnet) that is arranged at the carrier 17.

Figure 3:
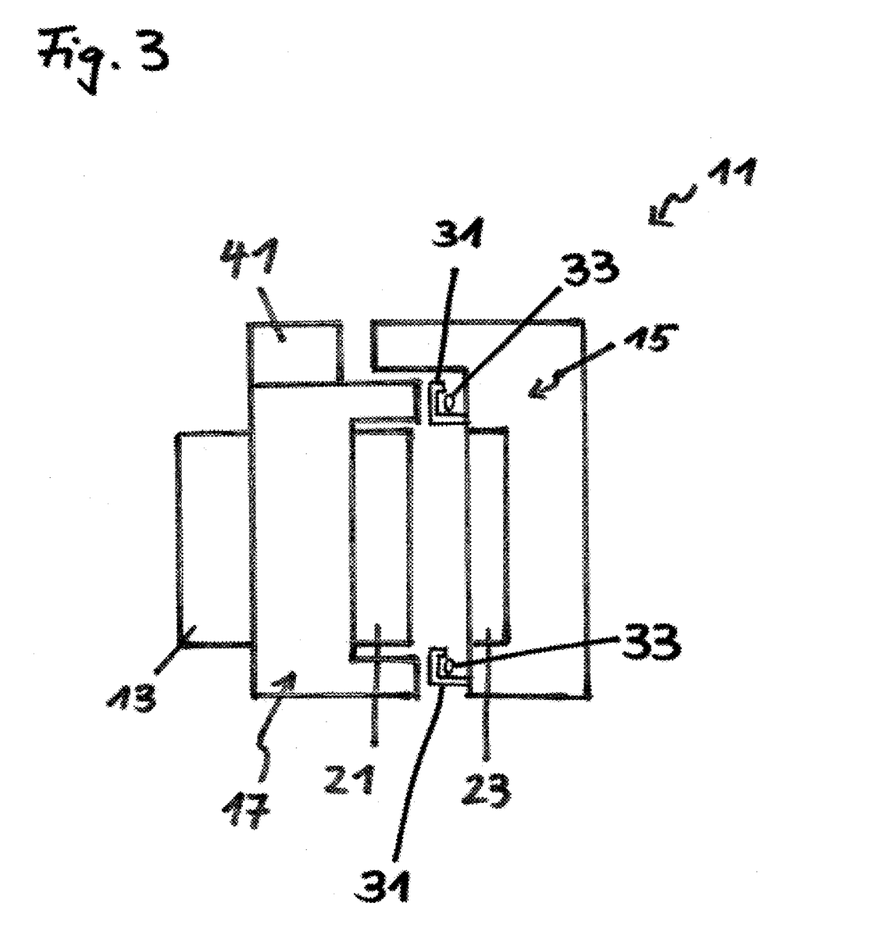
FIG. 3 a sectional view of a section of a linear motor system in accordance with a second embodiment with a sectional plane perpendicular to the guide track.

In FIG. 3, a segment of the linear motor system 11 with a carrier 15 in a second embodiment is shown in a sectional view. The second embodiment is identical to the first embodiment except that the linear motor system 11 has two securing means 33 that extend in parallel with one another at different heights along the guide track 17 and that are coupled to the carriers 15 by corresponding coupling elements 31. Linear motor systems 11 comprising more than two securing means 33 are likewise possible. A plurality of securing means 33 can likewise be coupled to the carrier 15 by a single-part coupling element.

Figure 4:
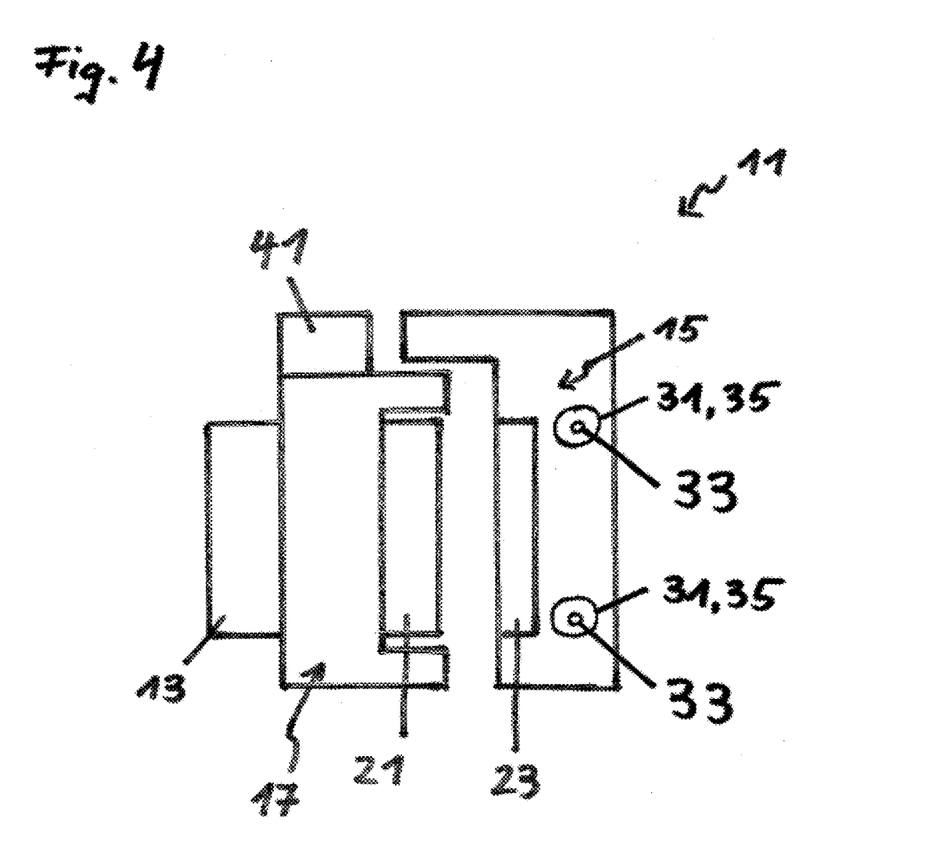
FIG. 4 a sectional view of a section of a linear motor system in accordance with a third embodiment with a sectional plane perpendicular to the guide track.

In FIG. 4, a segment of the linear motor system 11 with a carrier 15 in a third embodiment is shown in a sectional view. The third embodiment is identical to the second embodiment except that the coupling elements 31 are not configured as hooks between the carriers 15 and the guide track 17, but as leadthroughs 35 through the carriers 15, wherein the leadthroughs 35 are configured as closed leadthroughs within the carriers 15. In a linear motor system 11 in accordance with the invention, the number of leadthroughs 35 is not limited to two; one or more than two coupling elements 31 configured as leadthroughs 35 can thus also implement a linear motor system 11 in accordance with the invention.

Figure 5:
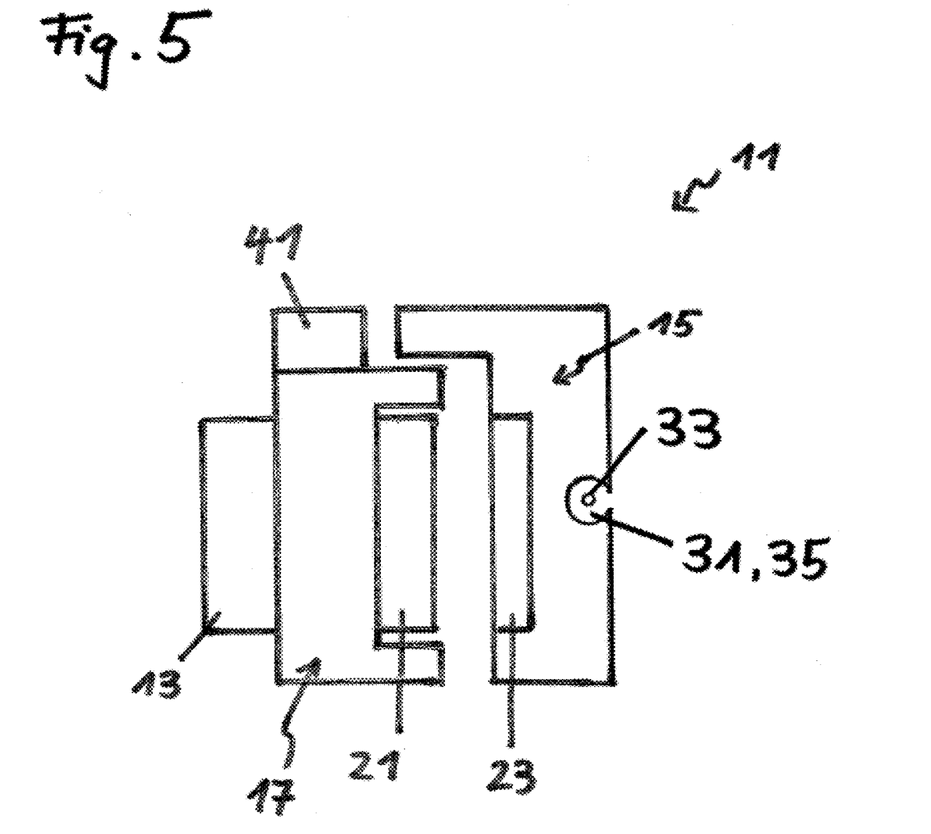
FIG. 5 a sectional view of a section of a linear motor system in accordance with a fourth embodiment with a sectional plane perpendicular to the guide track.

In FIG. 5, a segment of the linear motor system 11 with a carrier 15 in a fourth embodiment is shown in a sectional view. The fourth embodiment is identical to the third embodiment except that instead of the two leadthroughs 35 that are configured as closed leadthroughs within the carriers 15, the coupling element 31 is configured as a leadthrough 35 open at one side through the carrier 15. In the design of the coupling element as a leadthrough 35 open at one side through the carrier 15, a linear motor system 11 in accordance with the invention comprising more than one coupling element 31 can also be implemented.

REFERENCE NUMERAL LIST 11 linear motor system
13 linear motor
15 carrier
17 guide track
21 electromagnets
23 drive magnet
31 coupling element
33 securing means
35 leadthrough
41 detection means

The invention claimed is:

1. A linear motor system, comprising:
   a guide track that has a plurality of electromagnets arranged distributed along the guide track;
   at least one carrier that is guided by and movable along the guide track and that has a drive magnet for cooperating with the electromagnets to move the carrier;
   at least one coupling element; and
   at least one securing means that extends along the guide track and that is held by the coupling element, wherein
   the coupling element couples the securing means to the carrier, and
   the securing means is configured to brake and/or to stop the movement of the carrier in a direction away from the guide track and/or transverse to the guide track on a release of the carrier from the guide track.

2. The linear motor system in accordance with claim 1, wherein the securing means is a band closed in itself or a wire closed in itself.

3. The linear motor system in accordance with claim 1, wherein the linear motor system comprises a plurality of carriers and a plurality of coupling elements and the securing means is held solely by the coupling elements.

4. The linear motor system in accordance with claim 1, wherein the coupling element is releasably connected to the carrier.

5. The linear motor system in accordance with claim 1, wherein the coupling element is arranged between the guide track and the carrier.

6. The linear motor system in accordance with claim 1, wherein the coupling element is configured as at least one lead through through the carrier.

7. The linear motor system in accordance with claim 1, wherein the securing means is releasably guided through the coupling element.

8. The linear motor system in accordance with claim 1, wherein the carrier moves along the securing means.

9. The linear motor system in accordance with claim 1, wherein the securing means is held by the coupling element such that the securing means moves along the guide track.

10. The linear motor system in accordance with claim 1, furthermore comprising a detection means for detecting the spacing of the carrier from the guide track.

11. A method of operating a linear motor system that has a guide track that has a plurality of electromagnets arranged distributed along the guide track; at least one carrier that is guided by and movable along the guide track and that has a drive magnet for cooperating with the electromagnets to move the carrier; at least one coupling element; and at least one securing means, wherein the coupling element holds the securing means and couples the securing means to the carrier and the method comprises the following steps:

guiding the securing means through the coupling element; and moving the carrier along the guide track, wherein the linear motor system furthermore comprises a detection means for detecting the spacing of the carrier from the guide track and the method comprises the following step:

releasing the securing means from the carriers when the detection means detects a spacing between the carrier and the guide track, said spacing being smaller than a threshold value.

12. The method in accordance with claim 11, wherein the coupling element is releasably connectable to the at least one carrier and the method comprises the following step:

connecting the coupling element to the carrier.

13. The method in accordance with claim 11, wherein said spacing is permanently smaller than a threshold value.

* * * * *